United States Patent

[11] 3,613,752

| [72] | Inventor | Earl Crittlon Davis, Jr. |
| | | Moline, Ill. |
| [21] | Appl. No. | 811,536 |
| [22] | Filed | Mar. 28, 1969 |
| [45] | Patented | Oct. 19, 1971 |
| [73] | Assignee | Deere & Company |
| | | Moline, Ill. |

[54] CAM AND ROLLER GUIDE MEANS FOR TREE SHEARING BLADES
9 Claims, 5 Drawing Figs.

[52] U.S. Cl. .................................................... 144/34 E, 144/3 D
[51] Int. Cl. ....................................................... A01g 23/02
[50] Field of Search ............................................ 144/2 Z, 3 D, 34 E, 309 AC

[56] References Cited
UNITED STATES PATENTS
3,183,952  5/1965  Larson .......................... 144/3

2,955,631  10/1960  Hoadley ......................... 144/34 E
3,527,271  9/1970  Chateauneuf ................ 144/3 D
3,527,272  9/1970  Hamilton ....................... 144/3 D FOREIGN PATENTS
791,445  8/1968  Canada .......................... 144/34
1,313,995  11/1962  France ........................... 144/34 E Primary Examiner—Gerald A. Dost
Attorneys—H. Vincent Harsha, Harold M. Knoth, William A. Murray, John M. Nolan and Jimmie R. Oaks ABSTRACT: A tree shearing device that includes a shear blade supporting frame, a pair of levers pivotally supported on the frame for swinging movement toward and away from each other, a pair of blades pivotally supported for pivotal movement on the respective levers in a common plane, and cam means on the frame for guiding roller means carried by the blades for causing the blades to shift in a desired pattern in response to swinging the levers.

PATENTED OCT 19 1971

INVENTOR.
EARL C. DAVIS, JR.

BY *Jimmie R. Oaks*

ATTORNEY

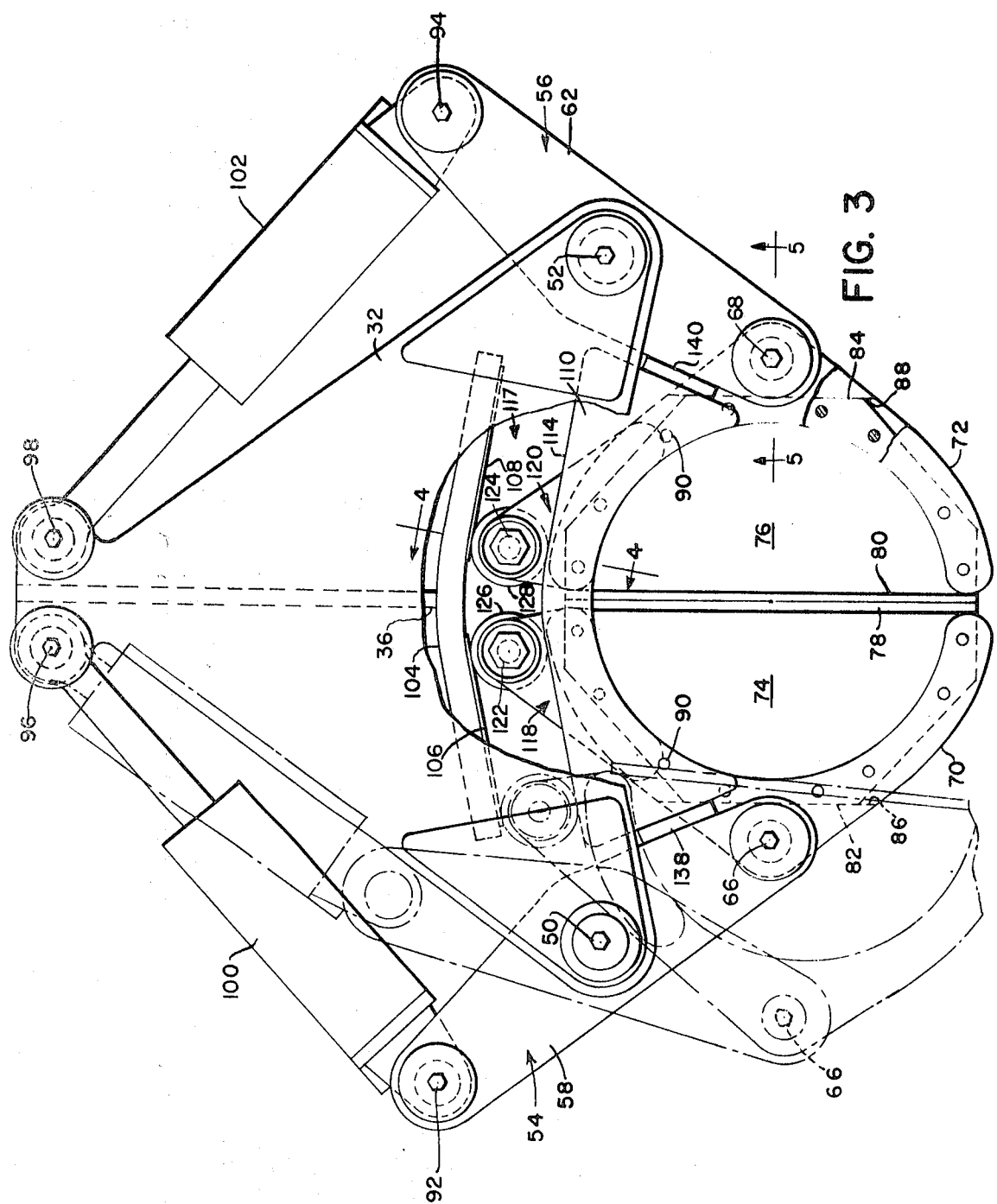

CAM AND ROLLER GUIDE MEANS FOR TREE SHEARING BLADES

BACKGROUND OF THE INVENTION

This invention relates to a tree shear and more particularly relates to a tree shear having a pair of hydraulic motor-actuated blades that swing in a common plane toward and away from each other and are guided in their movement by cam means which engage respective rollers carried by the blades to cause the latter to shift in a preferred pattern as they open and close with respect to one another. The tree shear device described herein is an improvement over a tree shear device described in the commonly assigned copending application Ser. No. 738,590 filed June 20, 1968.

In the tree shear of the above-noted copending application, there are included elongated abutments or cam means against which the shear blades bear and are guided as the blades are closed. Such construction, however, lacks the ruggedness necessary to withstand the forces encountered in tree shearing operation. Further, the blades are not constrained to follow the surface of the cam means when being withdrawn from a tree or when in transport and, consequently, they tend to rock freely about their pivotal connection to the lever arms.

SUMMARY OF THE INVENTION

According to the present invention, there is provided a novel means for guiding a pair of opposed shear blades toward and away from each other.

A more specific object is to provide a shear blade mounting frame having a cam supported thereon and to fix a roller to each of the shear blades to follow the cam.

Another object is to provide an abutment for holding the roller adjacent the cam surface.

Still another object is to provide a shear blade mounting and guide means which is rugged, compact, and reliable.

These and other objects will become apparent in the following detailed description and accompanying drawings.

BRIEF DESCRIPTION OF THE DRAWINGS

FIG. 3 is a plan view of the shearing assembly with the grapple tongs and boom connections removed and with portions broken away.

DESCRIPTION OF THE PREFERRED EMBODIMENT

Figure 1:
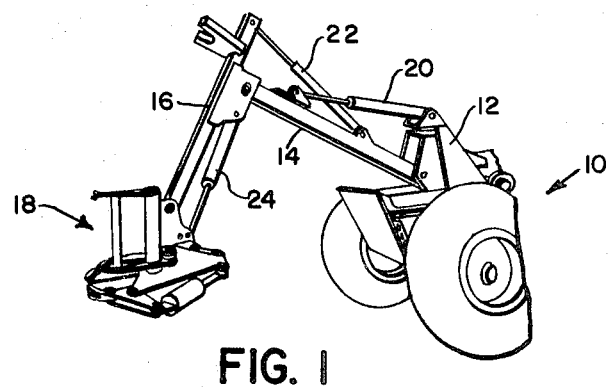
FIG. 1 is a perspective view showing a tractor equipped with a support mast and boom supports to which is attached a shearing assembly embodying the present invention.

The tree shearing device i of the type supported on a mobile frame such as a tractor 10. An implement supporting post structure 12 is carried on the tractor and supports a boom 14 which in turn has a second boom 16 carried at its outer end. The tree shearing assembly, indicated in its entirety by the reference numeral 18 is carried on the outermost end of the boom 16. Hydraulic cylinders 20, 22 and 24 are provided for adjusting the first boom 14, the second boom 16 and the tree shearing assembly 18.

Figure 4:
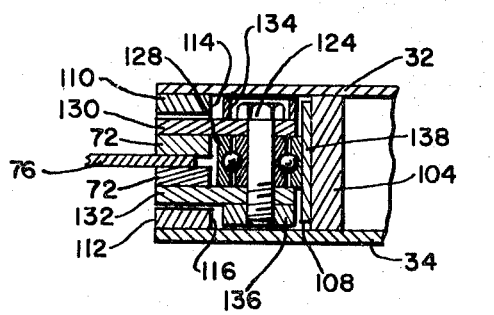
FIG. 4 is a sectional view taken substantially along the line 4—4 of FIG. 3.
Figure 5:
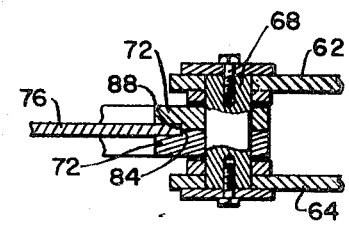
FIG. 5 is a sectional view taken substantially along the line 5—5 of FIG. 3.
Figure 2:
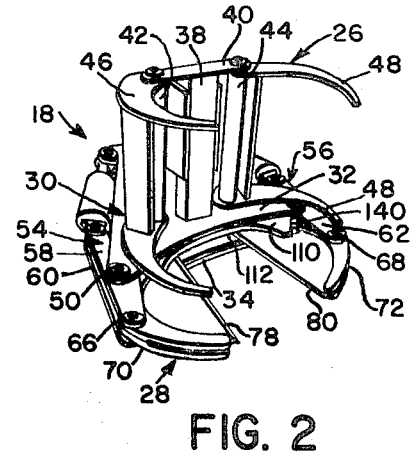
FIG. 2 is a perspective view of the shearing assembly showing the grapple tongs and shear blades in the open position.

The shearing assembly 18 is composed of an upper tree gripping portion 26 and a lower tree shearing portion 28. Referring now to FIGS. 2 through 5, inclusively, the shearing assembly 18 includes a generally planar mounting frame 30 including superposed top and bottom triangular plates 32 and 34 respectively. The plates are held in spaced relation and interconnected by a bar 36. Welded to and extending upwardly from the top plate 32 is a support post 38 to the top of which is welded a crossmember 40 which extends generally parallel to the plate 32. The opposite ends of the crossmember 40 have openings therethrough for pivotally receiving an end of a respective support rod 42 and 44. Forwardly directed grapple tongs 46 and 48 are fixed to the support rods 42 and 44 and each have upper and lower arcuate shaped arms that may be utilized to grip opposite sides of a tree. A hydraulic piston and cylinder means (not shown) is normally connected between the support rods 42 and 44 for moving the opposite pairs of grapple tongs toward and away from each other.

The plates 32 and 34 form a generally triangular assembly which is symmetrical about an axis X—X which extends through the rear corner and intersects the opposite front side. The plates support a pair of upright or vertical pivot pins 50 and 52 at the forward corners on opposite sides of the axis X—X and the pivot pins in turn support levers 54 and 56 respectively. The levers 54 and 56 are of the three-point type having their intermediate portions supported on the vertical pins 50 and 52 so that the entire levers swing horizontally. The levers 54 and 56 include pairs of spaced plates 58, 60 and 62, 64 respectively.

The forward ends of the levers 54 and 56 carry pivot assemblies 66 and 68 respectively which in turn pivotally support C-shaped clamps 70 and 72 which hold shear blades 74 and 76 respectively. As can best be determined from FIG. 3, the shear blades form opposite halves of an octagon with opposed cutting edges 78 and 80 and respective outer or seating edges 82 and 84. Each clamp 70 and 72 is formed of a pair of members which sandwich all except the cutting edge of the periphery of the shear blades and both members of each of the clamps have abutments 86 and 88 respectively against which the edges 82 and 84 of the shear blades 74 and 76 are seated. A plurality of sunken setscrews 90 fixedly hold the shear blades and clamps together.

The rearward ends of the levers 52 and 54 carry pivot pins 92 and 94 and the frame 30 carries pivot pins 96 and 98 at the rear corner on opposite sides of the axis X—X. A hydraulic actuator 100 for swinging the lever 54 about the pivot pin 50 has its opposite ends connected to the pivot pins 92 and 96 and a similar hydraulic actuator 102 for swinging the lever 56 about the pivot pin 52 has its opposite ends connected to the pivot pins 94 and 98.

An assembly is provided for guiding the shear blades in a desired pattern to traverse a tree shearing area in response to extension and retraction of the hydraulic actuators and includes a cam 104 which is welded to the forward end of the bar 36 and to the plates 32 and 34. The cam 104 extends transversely to the axis X—X and has opposite end portions which diverge slightly forwardly, the end portions having respective bearing surfaces 106 and 108. Spaced forwardly from the cam 104 and welded to the opposed faces of the plates 32 and 34 are respective plates 110 and 112 which have rear or retaining edges 114 and 116 which are parallel to and cooperate with the cam 104 to define a guide slot or channel 117. The rear ends of the clamps 70 and 72 support brackets 118 and 120 which extend between the plates 110 and 112 and carry pivot bolts 122 and 124 respectively which in turn carry rollers or followers 126 and 128. Only the bracket 120 is shown in detail, it being understood that the bracket 118 is similar. The bracket 120 includes upper and lower plates 130 and 132, the forward ends of which sandwich the clamp 72 and the rearward ends of which sandwich the roller 128. A first circular abutment 134 is welded to the top of the upper plate 130 and is disposed about the head end of the pivot bolt 124 and a second circular abutment 136 having a diameter the same as the first is welded to the bottom of the lower plate 132 and threadedly receives the bolt 124. The abutments are positioned so that they will engage the rear edges of the plates 110 and 112 and constrain the movement of the rollers to the guide slot or channel 117. A pair of stops 138 and 140 are provided at the front of the plate 110 to limit swinging movement of the levers 54 and 56 when they are moving toward each other. The rollers, guide slot and pivot pins 50 and 52 are so positioned with respect to each other that the shear blades 74 and 76 will trace approximately a straight-line path from the closed position shown in FIG. 3 when the cutting edges 78 and 80 abut against each other to the open position shown in FIG. 2 wherein the cutting edges diverge slightly and define a tree shear area therebetween.

In operation, the tractor is positioned near a tree to be cut and the booms 14 and 16 are adjusted to place the tree shearing assembly 18 at the desired location. The hydraulic actuators are retracted and the shear blades 74 and 76 are spaced apart and the shear assembly is adjusted to place the blades on opposite sides of the tree trunk at which time the hydraulic actuators are extended causing the levers 54 and 56 and the associated shear blades to move towards each other, thus shearing the tree. The rollers 126 and 128 will be forced against the associated bearing surfaces 106 and 108 as a result of a resistant force being applied to the shear blade during the shearing operation and the blades are guided by the cams 104 to move in a generally straight-line path. If the shear blades pivot so as to cause the rollers to move away from the bearing surfaces of the cam as might be the case when no load on the shear blades is present, the rollers are retained adjacent the bearing surfaces by contact between the circular abutments 114 and 116 and the rear edges of the plates 110 and 112 respectively, thus the rollers are always constrained to movement in the guide slot or channel 117.

While the actuators 100 and 102 are usually operated simultaneously, it should be understood that either may be operated while holding the other in a fixed position as a shear abutment.

I claim:

1. A tree shearing device comprising a mounting frame, shear blade means including a blade having generally parallel cutting and seating edges at opposite sides thereof, clamp means including a pair of superposed generally C-shaped members sandwiching substantially all but the cutting edge of the periphery of said blade and including abutments engaging said seating edge of said blade, fastener means extending through said C-shaped members and said blade for tightly holding the members against said blade and extensible and retractable means operably interconnected between the mounting frame and the clamp means for shifting the shear blade means to traverse a tree shearing area to one side of the frame.

2. A tree shearing device comprising: a mounting frame including a pair of spaced superposed plates fixedly interconnected to each other; a shear abutment carried by, and extending to one side of, said frame; a shear blade having an elongated cutting edge; and extensible and retractable means operably interconnected between said frame and said shear blade and being positioned such that said cutting edge will be moved toward and away from said abutment when said extensible and retractable means is actuated; open-ended guide slot means located between plates adjacent to said one side of said frame and including a bar fixed to said plates and having a bearing surface facing said blade; follower means fixed to said blade for engagement with said bearing surface; and said guide slot means further including retainer means fixed to said plates and having a surface disposed in confronting spaced relation to said bearing surface for engagement with said follower means to keep the latter in close proximity to said bearing surface.

3. The invention defined in claim 2 wherein said shear blade cutting edge extends generally perpendicular to said bearing surface; said follower means being secured to said blade adjacent that end of the cutting edge thereof which is closest to said bearing surface; and said extensible and retractable means including a lever having one of its ends pivotally connected to said blade at a point intermediate the ends of the blade on that side which is opposite from said cutting edge.

4. The invention defined in claim 3 wherein said follower means is a roller.

5. The invention defined in claim 3 wherein the lever and the guide slot and follower means are the sole connections between said frame and said shear blade.

6. A tree shearing device comprising: a mounting frame including a pair of spaced superposed plates fixedly interconnected to each other; shear blade means carried by and extending to one side of said frame and including a pair of shear blades having elongated confronting cutting edges; and extensible and retractable means operatively interconnected between said frame and said pair of shear blades for moving the cutting edges of the blades toward and away from each other; open-ended guide slot means located between said plates adjacent to said one side of said frame and including a bar fixed to said plates and having a bearing surface facing said pair of blades; follower means fixed to said blade means for engagement with said bearing surface; and said guide slot means further including retainer means fixed to said plates and having a surface disposed in confronting relationship to said bearing surface for engaging said follower means for keeping the latter in close proximity to said bearing surface.

7. The invention defined in claim 6 wherein said cutting edges extend generally perpendicular to said bearing surface; said follower means being secured to said blades adjacent the respective ends thereof that are closest to said bearing surface; and said extensible and retractable means including a pair of levers respectively having one of their ends pivotally connected to said pair of blades at points intermediate the ends of the blades on those sides which are opposite from said cutting edges.

8. The invention defined in claim 7 wherein said follower means is a pair of rollers respectively associated with said pair of blades.

9. The invention defined in claim 7 wherein said pair of levers, said bearing surface and said pair of follower means are the sole connections between said frame and said pair of shear blades.